United States Patent [19]
Ott

[11] 3,715,651
[45] Feb. 6, 1973

[54] ANALOG-TYPE CONSTANT-CURRENT REGULATOR

[76] Inventor: Erich Ott, Rudiger Strasse 15, Wiesbaden, Germany

[22] Filed: Jan. 4, 1971

[21] Appl. No.: 103,733

[30] Foreign Application Priority Data

Jan. 2, 1970 Germany.....................P 20 00 130.3

[52] U.S. Cl. ............323/4, 307/252 B, 307/252 UA, 323/22 SC, 323/24, 323/38
[51] Int. Cl..............................G05f 1/44, G05f 5/00
[58] Field of Search..........323/22 SC, 24, 34, 35, 38, 323/40, 4, 9; 307/252 B, 252 N, 252 UA

[56] References Cited

UNITED STATES PATENTS

| | | | |
|---|---|---|---|
| 3,538,427 | 11/1970 | Oltendorf............................323/24 |
| 3,577,177 | 5/1971 | Hewlett, Jr.....................323/22 SC X |
| 3,353,082 | 11/1967 | Mellott et al..................323/22 SC X |
| 3,395,334 | 7/1968 | Stein................................323/22 SC |

*Primary Examiner*—Gerald Goldberg
*Attorney*—Tab T. Thein

[57] ABSTRACT

Analog-type constant-current regulator which works as an alternating-current setting controller. It operates with a phase-angle split control and a zero-voltage switch. Across a rectifier, the actual value is impressed as a current. The regulator is suitable in particular for obtaining, independently of the load, a constant, effective alternating current, as a matter of example, for heating protective housings and small-diameter conduits in which measurements are made of liquid and gaseous substances. The main circuit of the regulator includes a series connection of the load with a transducer forming part of an actual-value rectifier circuit and a control circuit which is preferably in the form of a Triac.

33 Claims, 5 Drawing Figures

CONDUCTION TIME = 180° − FIRING TIME $$U_{R.M.S} = \hat{u}\sqrt{\frac{1}{\pi}\int_t^\pi \sin^2 t \, dt}$$

$$u_{AVERAGE} = \frac{1}{\pi}\hat{u}\int_t^\pi \sin t \, dt$$

FIRING TIME = 45°
CONDUCTION TIME = 180° − 45° = 135°

ANALOG-TYPE CONSTANT-CURRENT REGULATOR

Electrical devices in which measurements are made of liquid and gaseous substances are required to have an unchanged effect under varying conditions. For instance, in case of tubes or conduits having equal heat losses, the heating of the same requires an identical heating effect for each determined length of the conduit. In the chemical and especially the petrochemical industry, the heating arrangements are often required to have an equal power per length applied while having a differentiated total power, since the conduits have different lengths.

With regard to this kind of heating arrangement, the setting of the electrical power supply to a standard value requires a specific device which provides for a constant, effective current which is independent of the load.

In the prior art there have been known various constant-current sources and regulators for direct current. These devices are usually provided with active bridge circuits having a compensated internal resistance. The constant-current sources derive from the network a constant power fluctuating only with the network's own voltage. The constant power, after substraction of the necessary leakage power, is converted to heat either in the device itself or in the load. Thus the electrical power leakage results in a heating effect within the device. This means that a great deal of the electric energy is converted to heat in a place where it is not required.

These constant-current sources are not applicable in temperature regulators wherein the measurement is carried out subject to the temperature of the device itself. The reason herefor is that the temperature measurement is affected by the self-heating of the device and thus causes serious errors. Such constant-current sources are described in various publications of the companies Siemens & Halske, Intermetall and RCA. The publications in question are titled:

Siemens & Halske: Schaltungen mit Halbleiterbauelementen /Circuits with Semiconductor Elements/
Intermetall: Schaltbeispiele /Circuit Examples/
RCA: Silicon Power Circuits Manual.

The company Hartmann & Braun A.G., Germany, discloses such an apparatus in an article entitled "Continuous Regulator with a Thyristor Setting Amplifier", in the publication "Kunststoffe" /Plastics/, 58/1968, vol. 10, pp. 681 to 683. This regulator provides a uniform heating of heating wires while controlling at the same time the energy on the load by alternating-current pulse groups. The current flowing in said regulator is a quasi-constant alternating current. The current might be designated as constant if consideration be paid not only, as it is usually done, to the two sine half-waves, i.e. to one full cycle, but to a plurality of pulse groups consisting of a number of half-waves.

As a matter of principle, the alternating-current controller, being either a Thyristor or a Triac, is basically ignited after the zero-crossing passage of the network voltage while the second half-wave is necessarily ignited after the first half-wave has been passed through. During a single cycle there always flows a current which is determined only by the network voltage and the load. The work, or put otherwise, the heating energy is governed by the change of the relation between the switched-on and the switched-off alternating-current cycles. If integration lasts longer the heat produced is steady. It is thus correct to state that the regulator produces uniform heating but according to accepted definitions, the alternating current which flows therein cannot be designated as "constant".

It is the object of this invention to provide an analog-type constant-current regulator capable of supplying a predetermined, steady effective alternating current despite of a varying load. The regulator must respond to changes in a ratio larger than 1:3. Both half-waves of the network voltage should be fully exploited in the regulator so that a high percentage of the effective network voltage can be utilized.

The regulator according to the invention achieves the above objects such that it has the input-current flow or forward flow angle coupled as a corrective value for eliminating the effects of disturbance variables.

If the desired-value setting device or circuit is corrected in response to the current flow angle, then use can be made of an arithmetical average-value rectifier for purposes of an actual-value setting circuit. The desired current value is to be corrected to follow, within certain error limits, the equation $$U_{desired} = U_{180\,aof} \cdot k \cdot \frac{1+\cos t}{\sqrt{1-t/\pi+\sin(2t)/2\pi}}$$

wherein "acf" stands for the current flow angle. The factor $k$ takes into account the final value at full 180° modulation. Equations and diagrams fully explaining the considerations underlying this invention are being presented somewhat later in the description.

British Pat. No. 821,089 published Sept. 30, 1959, titled "Voltage Regulator", issued to Sorensen-Ardag, a Swiss Company (based on a U.S. patent application filed Sept. 24, 1956, discloses an alternating-current voltage regulator with a transducer, in which a saturable reactor is coupled between an alternating-current power source and the load for controlling an effective alternating-current parameter, namely the voltage. A sensing circuit is disposed across the load, which is provided with a resistor diode gate connected to a two-way rectifier circuit. Two potential-free voltages are fed to the gate for making the output of the combined diode circuit closely to approach a current - voltage relationship with a square characteristic. The sensing circuit is connected to a transistorized amplifier which latter is connected with its output to and controls the saturable setting reactor of the device so that a steady, effective voltage results.

The circuitry described in the foregoing includes a coupling circuit which is not suitable for prolonged operation. If under load for a certain period of time, the batteries installed in the device change their voltage. They should be substituted by network-fed stabilized constant-voltage devices. Besides, from the technical viewpoint, such devices are too complex since they include numerous heavy parts, making the devices excessively expensive in their production costs.

Thyristors or Triacs if used as final control devices would be considerably cheaper; however they cannot be employed in connection with resistor - diode gates of such arrangements.

According to important features of the invention, the analog-type constant-current regulator comprises an actual-value rectifier upon which the actual current is impressed, a circuit for coupling the forward flow angle of the current to the input, as a corrective value for eliminating disturbance variables, and a controller, preferably in the form of a Triac, constituting a final control element for adjusting the desired alternating current. The corrective value is derived from the voltage drop across said Triac. A protective circuit may be added for the latter, preferably in the form of at least one RC member, to prevent excess voltage pulses from reaching the same.

According to yet another important feature, a circuit is provided for setting the desired value, at least within the range of 13° to 150° of the forward flow angle. The setting circuit is preferably in the form of a voltage divider upon which is impressed a positive voltage, corrected by a negative voltage which increases with a decreasing value of the forward flow angle. A supplemental load may be provided, including, as a matter of example, a Zener diode and at least one resistor.

An additional circuit may also be provided according to the invention, to make the desired value dependent on the voltage divider, and including at least one capacitor for suppressing high-frequency oscillations.

In accordance with further important features of the invention, the regulator may comprise an average-value rectifier for measuring the load current, a differential amplifier upon which are impressed, and wherein are compared, the output of the just mentioned rectifier as well as the corrected desired value for the setting circuit, a synchronizing circuit, and an ignition pulse circuit. The differential amplifier is connected, by the intermediary of the synchronizing and the ignition pulse circuits, to drive the controller, e.g. at the control electrode of the Triac.

In an exemplary circuit arrangement, the differential amplifier includes two transistors forming part of a bridge which is balanced when the impressed voltage values are equal, derived from the actual-value rectifier and from the setting circuit. The amplifier may include a capacitor which is discharged through the synchronizing circuit during each zero-axis crossing of the network voltage. A negative feedback is preferably incorporated in the differential amplifier.

RC members in an end stage, associated with the amplifier, are provided to obtain an approximately proportional - integral regulation.

The synchronizing circuit may be provided, according to the invention, in the form of a zero-voltage switch associated with the controller (the Triac). A phase-correcting voltage divider may form part of the zero-voltage switch.

Finally the preferred inventive regulator embodiment may also comprise a temperature regulator operatively connected with the housing or conduit in which a uniform temperature is to be maintained, for controlling the ignition pulse circuit. The temperature regulator may include a Schmitt trigger and may have two-stage regulation.

Other objects and many of the attendant advantages of the invention will be readily appreciated as the same becomes better understood by reference to the following detailed description, when considered with the accompanying drawings, wherein FIG. 1 is a diagram illustrating the operation of the analog-type constant-current regulator according to the invention, wherein current values are plotted against the angles of ignition and of current flow, showing the basic load and the useful control range of the regulator;

FIG. 4a illustrates the prior art.

Figure 1:
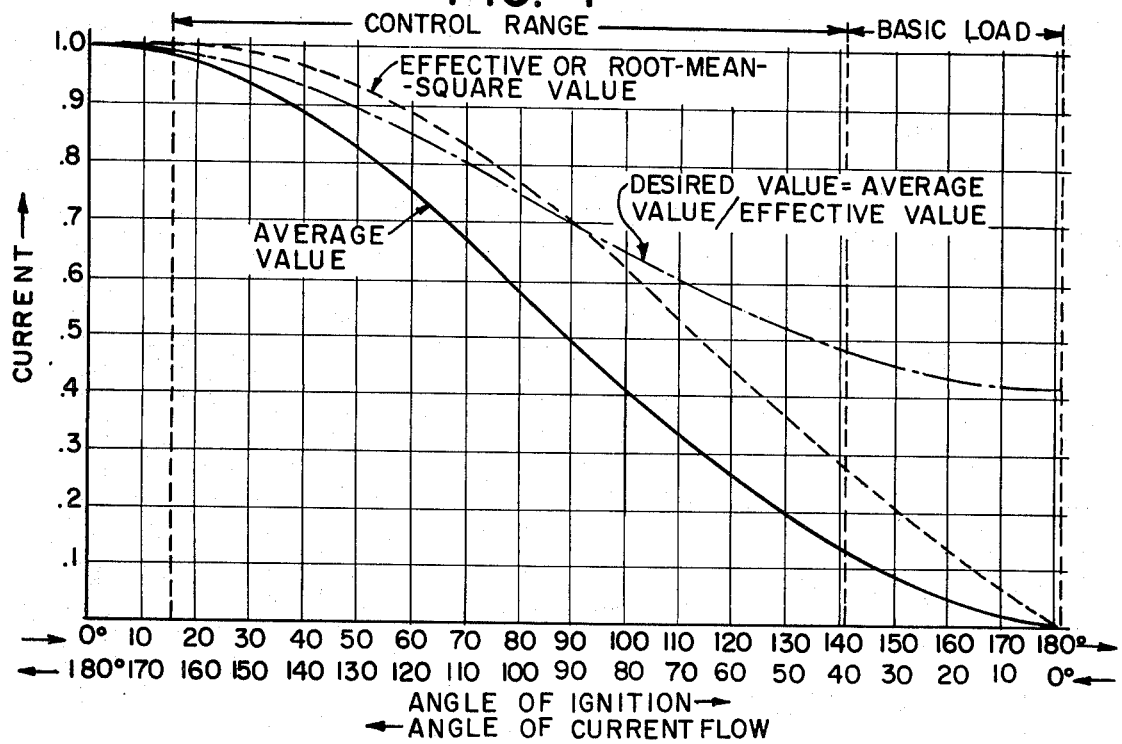

The diagram of FIG. 1 shows the operation of the analog-type regulator according to the invention, and illustrates its function. The object of the invention is to permit the load to change within limits greater than 1:3. Therefore, the desired current value must be adjustable only within a range of between 13° and 150° of the forward flow angle of the actual current in the circuit, as can be seen in the diagram (delimited essentially by the legend "Control Range").

Within the control range, the desired-value curve may be illustrated with a sufficient precision by three straight lines. This involves that the above-mentioned flow-angle function may be substituted by another function, consisting in the subtraction or addition of voltages.

Considering the circuitry to be provided, this is attained in such a manner that there is provided a desired-value voltage divider B (see FIG. 2) whereto a positive voltage is applied, and that the divider is corrected by a negative voltage increasing with a decreasing flow angle, and is affected by a supplemental load of a Zener diode and a resistor, forming part of the voltage-divider circuit. Besides, with regard to the voltage, an actual-value rectifier D has a high value owing to negative feedback resistors used in the circuitry. Due to a particular design of the above-said rectifier an accuracy greater than 99 percent may be achieved of the earlier discussed theoretical function.

Figure 2:
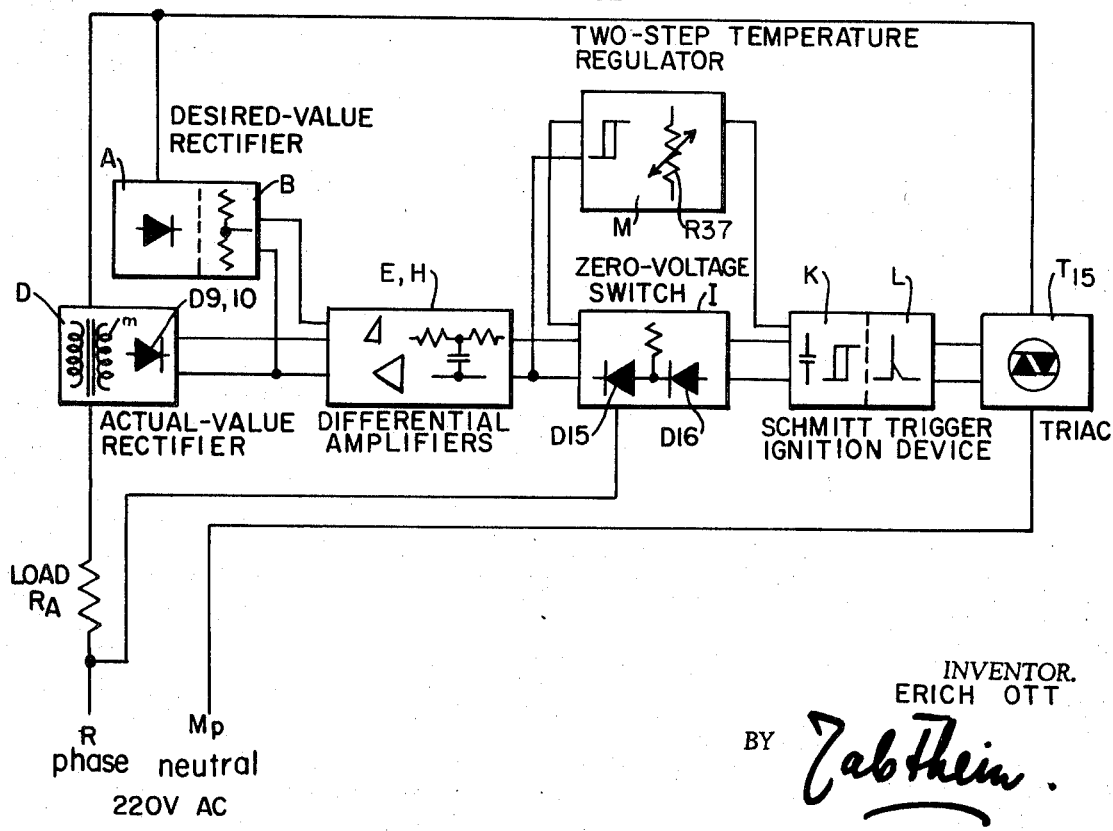
FIG. 2 is a somewhat schematic block diagram illustrating the function of the regulator according to the invention, with the more important circuit elements shown in block form and in their correlation.

The block diagram of FIG. 2 illustrates the function of the analog-type regulator according to the invention when dealing with alternating current. A main circuit includes a load $R_A$ (not identified as such in FIG. 3), a transducer $m$ in actual-value rectifier D and a final control element preferably in the form of a Triac, designated T15. The current is measured as a controlling parameter between the load and the Triac, and it is compared with the corrected desired value which latter derives its influencing value from the voltage drop across the Triac.

The desired and actual current values are compared in a differential amplifier including, as a matter of example, circuit sections E, H. They are provided with an RCR member for achieving the necessary regulating action. The output signal of this amplifier charges a capacitor, which in turn discharges through a synchronizing stage I during each zero-axis crossing of the network voltage. Whenever the charging voltage of the capacitor exceeds a predetermined value, a Schmitt trigger K is tripped to reverse, and then charges a capacitor. As soon as the latter attains a predetermined voltage value, an ignition pulse stage L is fired and the capacitor discharges across the gate of Triac T15 which then becomes conductive.

Figure 3:
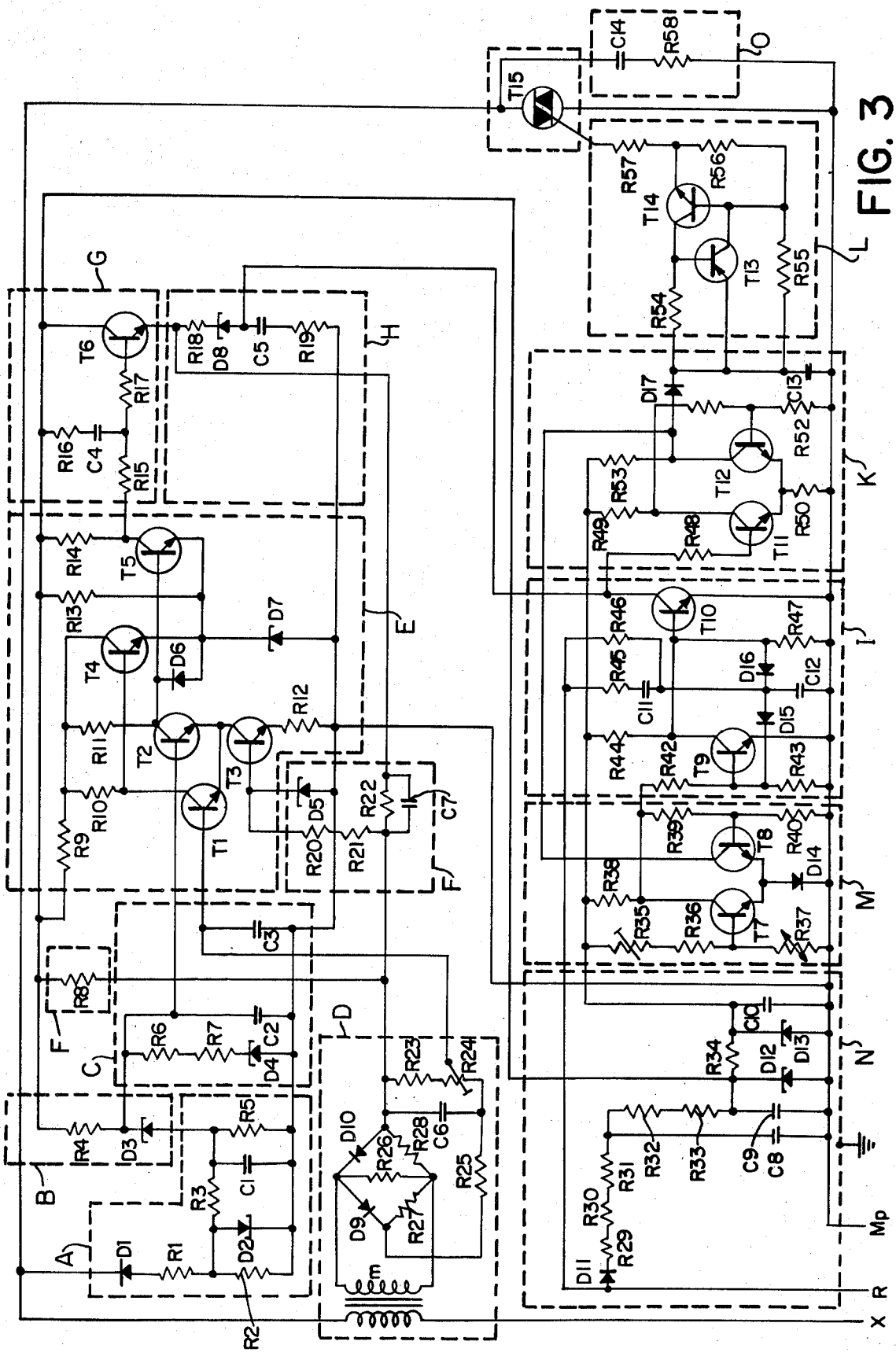
FIG. 3 is a detailed circuit diagram showing the electrical component parts of the regulator in a preferred, exemplary embodiment.

FIG. 2 also shows a desired-value rectifier circuit A, associated with the afore-mentioned voltage divider B, and serving to set the desired value. The diagram also includes an optional two-step temperature regulator M which will be explained as the description proceeds, together with certain prominent elements of the circuitry also shown in FIG. 2 but not referred to so far (such as diodes D9, D10, D15, D16; resistor R37). The schematic diagram also shows a 220 AC network connection including a phase line identified as R and a neutral line marked $M_p$; in addition, FIG. 3 shows a line X leading to the primary of transducer $m$ in the complete circuit of the preferred embodiment. The housing may be grounded, as usual (indicated in FIG. 3).

In the circuit diagram of the inventive analog-type regulator in its preferred, exemplary embodiment, as shown in FIG. 3, the voltage dropped across Triac T15 is led to desired-value rectifier A which includes a diode D1, resistors R1, R2, R3, R5, a capacitor C1 and a Zener diode D2. The latter is provided in the device for making the direct voltage on capacitor C1 independent of the network voltage value so that the direct current is simply a function of the current flow angle. The direct voltage is negative with reference to the zero point of the circuit.

The appropriate desired-value voltage is generated by voltage divider B including a resistor R4, a Zener diode D3 and the internal resistance of the just-described desired-value rectifier, and is available across diode D3; this voltage is positive.

It will be shown in equations and diagrams that the direct current obtained from the desired-value rectifier circuit A is a function of the current flow angle through the Triac T15 which constitutes the final control element in the inventive regulator. The following mathematical definitions and stipulations should be considered:

$$u = \hat{U} \cdot \sin t$$

$$\hat{U} = U \cdot \sqrt{2} \text{ (full sine wave)}$$

$$0° \leq t \leq 180°$$

The voltage of the desired-value rectifier can be derived, as will appear from the equations, where
1. $U_{R.M.S.}$ values
2. $U_{average}$ values, and finally
3. $U_{desired}$ values will be presented, considering that
   $U_{desired}$ = voltage of the desired-value rectifier circuit $U_{180}$ desired = voltage of the same circuit when the current flow angle is 180°
   $U_{R.M.S.}$ = effective voltage value at a particular current flow angle
   $U_{average}$ = arithmetic mean value of the voltage at a particular current flow angle
   $t$ = firing time or firing angle
   $u$ = instantaneous voltage
   $U$ = amplitude voltage
   $U$ = r.m.s. (effective) mean voltage value at a current flow angle of 180° (full sine half-wave)

(1)
$$U_{R.M.S.} = \sqrt{\frac{1}{\pi}\int_t^\pi \mu^2 \cdot dt}$$
$$= \sqrt{\frac{1}{\pi}\int_t^\pi \hat{U}^2 \cdot \sin^2 t\, dt}$$
$$= \hat{U} \cdot \sqrt{\frac{1}{\pi}\int_t^\pi \sin^2 t\, dt}$$
$$= U \cdot \sqrt{2} \sqrt{\frac{1}{\pi}\int_t^\pi \sin^2 t\, dt}$$
$$= U\sqrt{\frac{2}{\pi}\int_t^\pi \sin^2 t\, dt}$$
$$= U\sqrt{\frac{2}{\pi}\left(\frac{\pi}{2}-\frac{t}{2}+\frac{\sin(2t)}{4}\right)}$$
$$= U\sqrt{1-\frac{t}{\pi}+\frac{\sin(2t)}{2\pi}}$$

(2)
$$U_{AVERAGE} = \frac{1}{\pi} \cdot \int_t^\pi \mu \cdot dt$$
$$= \frac{1}{\pi}\int_t^\pi \hat{U} \cdot \sin t \cdot dt$$
$$= \frac{1}{\pi} \cdot \hat{U} \int_t^\pi \sin t \cdot dt$$
$$= \frac{1}{\pi} \cdot U \cdot \sqrt{2} \int_t^\pi \sin t \cdot dt$$
$$= \frac{\sqrt{2}}{\pi} \cdot U(1+\cos t)$$

(3)
$$U_{desired} = \frac{U_{AVERAGE}}{U_{R.M.S.}} \cdot U_{180\,desired}$$
$$= \frac{\sqrt{2}/\pi \cdot U \cdot (1+\cos t)}{U\sqrt{1-t/\pi+\frac{\sin(2t)}{2\pi}}} \cdot U_{180\,desired}$$

$$\frac{\sqrt{2}}{\pi} = k$$

$$U_{desired} = U_{180\,desired} \cdot k \cdot \frac{1+\cos t}{\sqrt{1-\frac{t}{\pi}+\frac{\sin(2t)}{2\pi}}}$$

Figure 4A:
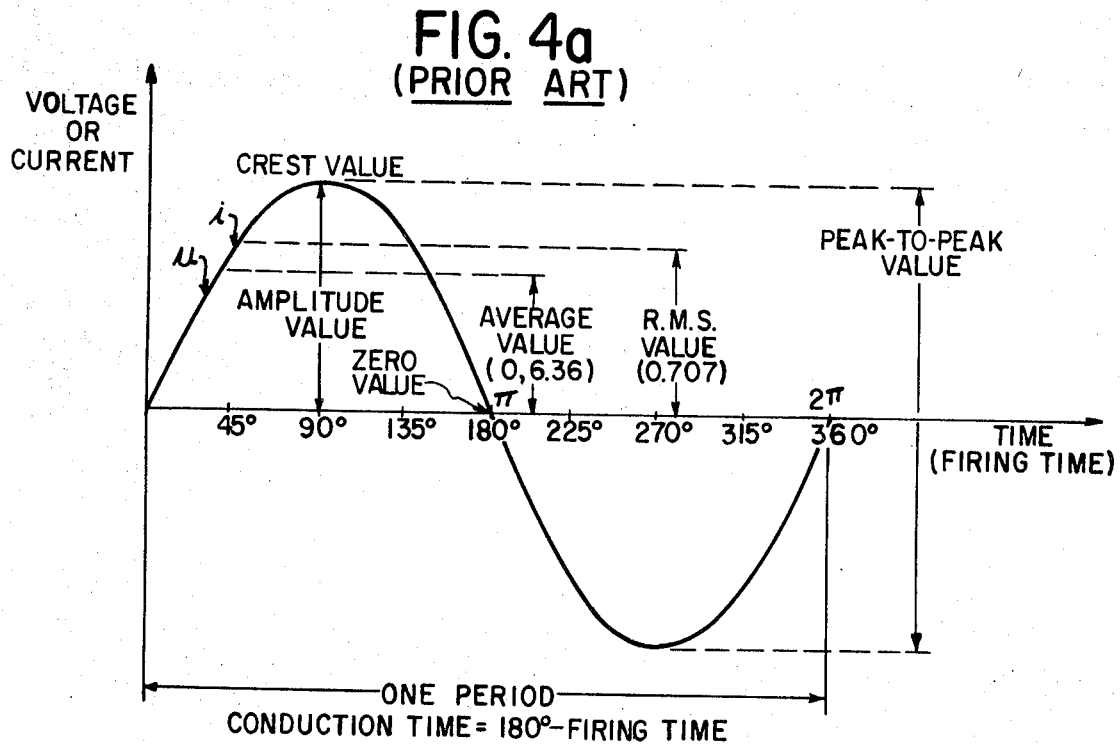
FIGS. 4a and 4b are explanatory diagrams of respective courses of angular current-flow changes, at various firing times (180° and 45°, respectively), for one full cycle of the alternating current.
Figure 4B:
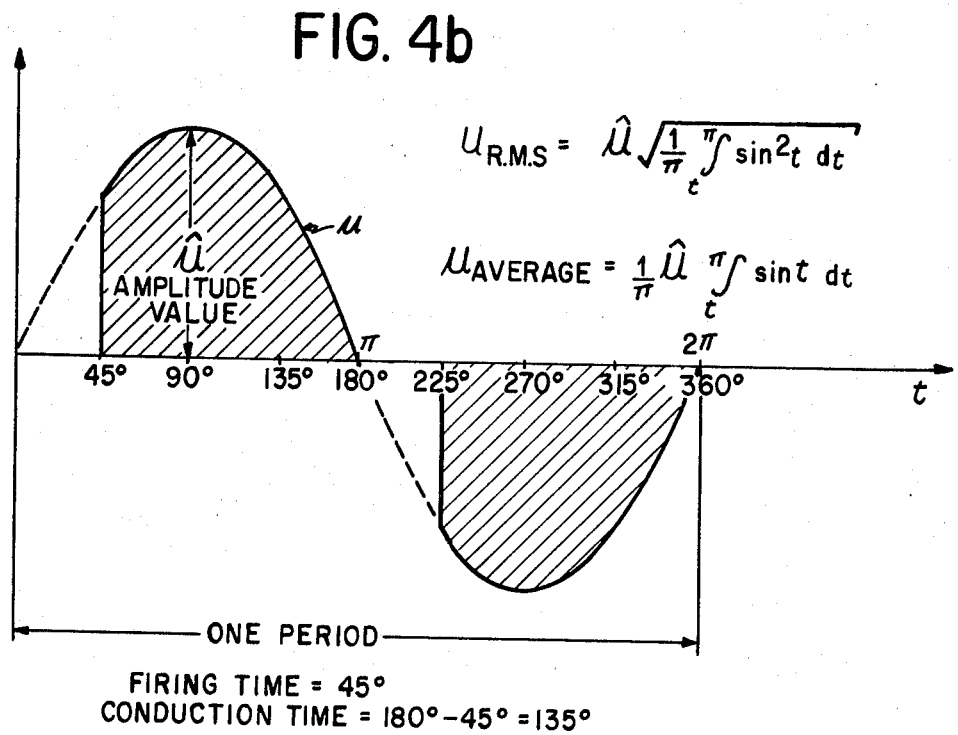

Reference is also being had to FIGS. 4a and 4b where courses of angular current-flow changes are shown, at various firing times (180° and 45°, respectively), each time for one full cycle of the alternating current.

By reason hereof any increase of the voltage on the desired-value rectifier involves a decrease of the desired value.

In order to make the latter dependent on the flow angle, the voltage divider is connected to and is charged by a resistor - Zener diode combination C, i.e. a circuit including resistors R6, R7 and a Zener diode D4. There are provided capacitors C2, C3 for suppressing high-frequency oscillations.

Actual-value rectifier D provides a direct voltage at resistors R23, R24 (the latter being preferably variable), the voltage correspoding to the arithmetical average value of the current. The rectifier includes a transducer (preferably in the form of a transformer) $m$, a basic load R26, diodes D9, D10, resistors R25, R27, R28, the afore-mentioned resistors R23, R24 and a capacitor C6.

Resistor R24 is in the form of a trimmer. On this resistor it is possible to set the magnitude of the desired effective constant current. From the standpoint of the potential, actual-value rectifier D is coupled positively against the zero point across a voltage divider F which includes resistors R8, R20, R21, as well as across a Zener diode D5. Consequently the component tolerances of the earlier-discussed desired-value rectifier A can be compensated by changes in resistors R20, R21.

On the other hand, negative feedback on differential-amplifier circuit E is achieved across voltage divider F, formed by resistors R20, R21 and another resistor R22, a capacitor C7 and Zener diode D5.

Two input transistors T1, T2 of differential amplifier E are fed by a constant-current source with a current resulting from the voltage drop on diode D5, a transistor T3 and a resistor R12. The input transistors as well as resistors R10, R11 form a bridge which is balanced only if the same voltage flows through both transistors T1, T2. This conditions a differential voltage of zero volts while any individual voltage at the input of differential amplifier E must be greater than the voltage on diode D5.

The detuning of the bridge is one-sidedly evaluated by transistors T4, T5. Through a resistor R9 associated with transistor T4, there also flows the constant current while the emitter voltage of transistors T4, T5 is kept high by a Zener diode D7. The amplifier is therefore blocked when there is a negative detuning voltage. A resistor R13 supplies Zener diode D7 with a minimum current which provides a sufficient steady voltage for said diode.

A diode D6 provides protection against high negative voltages. A resistor R14 of transistor T5 has available a voltage proportional to the positive differential voltage. This voltage is supplied to an end-stage transistor T6, in block G, of a grounded-collector circuit across an RCR member including resistors R15, R16, R17 and a capacitor C4. The RCR member provides the necessary regulating effect which is approximately proportional - integral.

Another differential-amplifier circuit H, at the emitter of transistor T6, supplies its output signal to the negative feedback, on the one hand, and to a capacitor C5 via a resistor R18 and a Zener diode D8, on the other hand. A resistor R19 restricts the discharge current.

The discharge of capacitor C5 is carried out by a synchronizing zero-voltage (passage) switch I during each zero crossing in the network voltage unless said switch is blocked. The zero-voltage switch, being a synchronizing stage of the device, includes a phase-correcting voltage divider provided with resistors R45, R46, a capacitor C11 and the internal resistance in the switching circuit. A capacitor C12 is provided for suppressing coupling oscillations. An output transistor T10 of the switch discharges capacitor C5 across resistor R19 when it has been energized.

Transistor T10 is energized only when a transistor T9 is not energized or when no sufficiently negative voltage is available through a cooperating diode D16. This occurs during the negative half-wave of the network voltage. The positive half-wave controls transistor T9 across a diode D15. Therefore the current controlling transistor T10 can flow through a resistor R44 only during the zero crossing of the network voltage. Any voltage present on a resistor R42 blocks synchronizing zero-voltage switch I, and capacitor C5 is not discharged any more. Resistors R43, R47 form a symmetrical base load for the just-described voltage divider.

The charging voltage of capacitor C5 is controlled by Schmitt trigger K. This includes resistors R48, R49, R50, R51, R52, R53, as well as transistors T11, T12. Whenever the voltage on capacitor C5 reaches a particular value, the Schmitt trigger is switched. Its output voltage, present on resistor R53, charges a capacitor C13 across a diode D17.

Transistors T13, T14 and resistors R54, R55, R56 perform the function of ignition device L. Capacitor C13 is discharged across this arrangement into a current-limiting resistor R57 and through the gate of the earlier-mentioned Triac T15 so that the latter ignites.

When this happens, the regulator M, acting as a blocking circuit, is activated which is an electronic two-step temperature regulator provided with a second Schmitt trigger which latter includes resistors R38, R39, R40 and coacting with the earlier-mentioned resistor R53, a diode D14 and transistors T7, T8. In this circuit, resistor R53 also functions as the working resistor of the Schmitt trigger for the ignition circuit, i.e. for diode D14 and transistors T7, T8.

Within the scope of obtaining a low switching hysteresis, the second Schmitt trigger includes said diode D14 as a resistance common to the emitters of transistors T7, T8. The input of the Schmitt trigger is connected directly to a voltage divider including a trimmer R35, a resistor R36 and a thermistor R37. The dividing ratio is influenced by a heat conductor constituted by thermistor R37. The switching point corresponding to the desired temperature is set at trimmer R35.

If there is a drop below a certain predetermined temperature, the Schmitt trigger of circuit M turns on the regulator so that the operating range circuit of the regulator has coupled thereto the Schmitt trigger in which case transistor T7 conducts whilst transistor T8 is cut off.

In this event the voltage on resistor R38 of transistor T8 is coupled to the input of blocking and synchronizing switch M. If the two-step temperature regulator is cut off, the synchronizing zero-passage switch is blocked and transistor T11 is actuated. Being so, ignition pulse stage L would have available the full voltage if transistor T8 were not actuated. In this way, the voltage is short-circuited. When the temperature regulator operates, transistor T8 opens and the voltage on resistor R42 breaks down. Consequently the inventive analog-type regulator is not influenced any more by the temperature regulator.

A power unit N of the device, fed by the 220 V AC line, is arranged to work on 24 volts or 12 volts. It includes resistors R29, R30, R31, R32, R33, R34, a diode D11, Zener diodes D12, D13 and capacitors C8, C9, C10. The operation of this unit will be readily understood by those skilled in the art and need not be explained in more detail.

An RC member O, including a resistor R58 and a capacitor C14, is provided to serve as a protective circuit for Triac T15 to prevent any excess voltage pulses reaching the same.

It should be understood, of course, that the foregoing disclosure relates only to a preferred, exemplary embodiment of the invention, and that it is intended to

What I Claim Is:

1. An analog-type constant-current regulator for obtaining a desired value of a constant, effective alternating current, independent of its load, such as for providing a source of current for maintaining a uniform temperature by electric heating, e.g. in protective housings and small-diameter conduits for the measurement of fluid parameters; the regulator comprising, in combination: an actual-value rectifier circuit upon which the actual current value is impressed; a controller circuit for adjusting the desired alternating current; a circuit for coupling said corrective value to a circuit for setting said desired value; an average-value rectifier circuit for measuring the load current; a differential amplifier circuit upon which are impressed, and wherein are compared, the output of said average-value rectifier circuit and the corrected desired value for said setting circuit; a circuit for coupling the forward flow angle of said actual current to an input circuit of said differential amplifier, as a corrective value for eliminating disturbance variables; a synchronizing circuit; an ignition pulse circuit; said differential amplifier circuit being connected, by the intermediary of said synchronizing circuit and said ignition pulse circuit, to drive a control electrode in said controller circuit; and a temperature regulator circuit, operatively connected with the housing or conduit in which said uniform temperature is to be maintained, for controlling said ignition pulse circuit, wherein said temperature regulator circuit includes two stages for incremental regulation.

2. The regulator as defined in claim 2, further comprising a phase-angle split control circuit capable of correcting variations of said load at least within the ratio of 1:3.

3. The regulator as defined in claim 1, wherein said controller circuit is in the form of a Triac, said corrective value being derived from the voltage drop across said Triac.

4. The regulator as defined in claim 3, further comprising a main circuit including a series connection of said load with a transducer forming part of said actual-value rectifier circuit and said Triac.

5. The regulator as defined in claim 3, further comprising a protective circuit for said Triac, in the form of at least one RC member, to prevent excess voltage pulses from reaching said Triac.

6. The regulator as defined in claim 1, further comprising elements in said circuit for setting said desired value at least within the range of 13° to 150° of said forward flow angle of the actual current.

7. The regulator as defined in claim 1, wherein said circuit for setting the desired value is in the form of a desired-value voltage divider circuit upon which is impressed a positive voltage, corrected by a negative voltage which increases with a decreasing value of said forward flow angle of the actual current, and including a supplemental load circuit.

8. The regulator as defined in claim 7, wherein said supplemental load circuit includes a Zener diode and at least one resistor.

9. The regulator as defined in claim 8, further comprising a circuit including a Zener diode and at least one resistor for making said desired value dependent on said voltage divider circuit, and at least one capacitor for suppressing high-frequency oscillations.

10. The regulator as defined in claim 1, wherein said differential amplifier circuit includes two transistors connected to respective outputs of said actual-value rectifier circuit and said circuit for setting the desired value, said transistors forming part of a bridge circuit which is balanced in the event of equal impressed voltage values.

11. The regulator as defined in claim 1, wherein said differential amplifier circuit includes a capacitor which is charged by the output of the former and is in turn discharged through said synchronizing circuit during each zero-axis crossing of the network voltage.

12. The regulator as defined in claim 1, wherein said differential amplifier circuit includes circuit elements constituting a negative feedback circuit.

13. The regulator as defined in claim 1, further comprising an end stage associated with said differential amplifier circuit and including RC members providing an approximately proportional - integral regulating effect.

14. The regulator as defined in claim 1, wherein said synchronizing circuit is in the form of a zero-voltage switch associated with said controller circuit.

15. The regulator as defined in claim 14, wherein said zero-voltage switch includes a phase-correcting voltage divider circuit.

16. A constant-current regulator for obtaining a desired value of a constant, effective alternating current, independent of the load and the mains voltage, such as for providing a source of current for maintaining a uniform temperature by electric heating, e.g. in protective housings and small-diameter conduits for the measurement of fluid parameters; the regulator comprising, in combination, a first circuit for making the desired value dependent upon the phase angle of the current flow from the source of current, a differential amplifier circuit for comparing parameters of the load current and of a presettable corrected desired value, and a second circuit for impressing a direct voltage upon the input of said differential amplifier, wherein said direct voltage is dependent on the angle of current flow and constitutes the corrective value for disturbance variables.

17. The regulator as defined in claim 16, further comprising a phase-angle split control circuit for correcting variations of said load at least within the ratio of 1:3.

18. The regulator as defined in claim 16, further comprising a controller circuit in the form of a Triac, said angle of current flow being derived from the voltage drop across said Triac.

19. The regulator as defined in claim 18, further comprising a main circuit including a series connection of said load with a transducer, forming part of an actual-value rectifier circuit upon which the actual current value is impressed, and said Triac.

20. The regulator as defined in claim 18, further comprising a protective circuit for said Triac, in the form of at least one RC member, to prevent excess voltage pulses from reaching said Triac.

21. The regulator as defined in claim 16, further comprising a third circuit for coupling said direct voltage to a fourth circuit for achieving said desired value.

22. The regulator as defined in claim 21, wherein said fourth circuit is in the form of a voltage divider circuit upon which is impressed a positive voltage, corrected by a negative voltage which increases with a decreasing value of said angle of current flow, and including a supplemental load circuit.

23. The regulator as defined in claim 22, wherein said supplemental load circuit includes a Zener diode and at least one resistor.

24. The regulator as defined in claim 23, further comprising a fifth circuit including a Zener diode and at least one resistor for making said desired value dependent on said voltage divider circuit.

25. The regulator as defined in claim 16, further comprising a rectifier circuit for measuring the load current, thus acting as an average-value rectifier, a synchronizing circuit, and an ignition pulse circuit, whereby said differential amplifier circuit is connected to a control electrode in said controller circuit by way of said synchronizing circuit and said ignition pulse circuit.

26. The regulator as defined in claim 25, further comprising a temperature regulator circuit, operatively connected with the housing or conduit in which said uniform temperature is to be maintained, for controlling said ignition pulse circuit, said temperature regulator circuit having two stages for incremental regulation.

27. The regulator as defined in claim 16, further comprising elements for setting said desired value at least within the range of 13° to 150° of the forward flow angle of the actual current.

28. The regulator as defined in claim 16, wherein said differential amplifier circuit includes two transistors forming part of a bridge circuit which is balanced in the event of equal impressed voltage values, one of said transistors being connected to the output of said second circuit while the other transistor is connected to the output of an actual-value rectifier circuit upon which the actual current value is impressed.

29. The regulator as defined in claim 16, wherein said differential amplifier circuit includes a capacitor which is charged by the output of the former and is in turn discharged during each zero-axis crossing of the mains voltage.

30. The regulator as defined in claim 16, wherein said differential amplifier circuit includes circuit elements constituting a negative feedback circuit.

31. The regulator as defined in claim 16, further comprising an end stage associated with said differential amplifier circuit and including RC members providing an approximately proportional - integral regulating effect.

32. The regulator as defined in claim 16, further comprising a synchronizing circuit in the form of a zero-voltage switch operatively associated with said differential amplifier circuit.

33. The regulator as defined in claim 32, wherein said zero-voltage switch includes a phase-correcting voltage divider circuit, and further comprising a controller circuit in the form of a Triac, said corrective value being derived from the voltage drop across said Triac, said differential amplifier circuit being connected, by the intermediary of said synchronizing circuit, to drive a control electrode in said Triac.

* * * * *